United States Patent
Raley (10) Patent No.: US 7,073,199 B1
(45) Date of Patent: Jul. 4, 2006

(54) DOCUMENT DISTRIBUTION MANAGEMENT METHOD AND APPARATUS USING A STANDARD RENDERING ENGINE AND A METHOD AND APPARATUS FOR CONTROLLING A STANDARD RENDERING ENGINE

(75) Inventor: Michael Charles Raley, Downey, CA (US)

(73) Assignee: Contentguard Holdings, Inc., Wilmington, DE (US)

( * ) Notice: Subject to any disclaimer, the term of this patent is extended or adjusted under 35 U.S.C. 154(b) by 834 days.

(21) Appl. No.: 09/649,841

(22) Filed: Aug. 28, 2000

(51) Int. Cl.
*H04L 9/32* (2006.01)
*H04L 9/00* (2006.01)
*G06F 15/16* (2006.01)
*G06K 9/00* (2006.01)

(52) U.S. Cl. .............. 726/26; 726/28; 726/29; 713/193; 705/51; 380/201; 380/231

(58) Field of Classification Search ........... 713/200, 713/201
See application file for complete search history.

(56) References Cited

U.S. PATENT DOCUMENTS

| | | |
|---|---|---|
| 3,263,158 A | 7/1966 | Janis |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,644,493 A | 2/1987 | Chandra et al. |

(Continued)

FOREIGN PATENT DOCUMENTS

EP 0 715 247 A1 6/1996

(Continued)

OTHER PUBLICATIONS

Vyoufirst Web site, Promoting and Protecting Web Views, Aug. 18, 2000, 8 pages.

(Continued)

*Primary Examiner*—Gilberto Barron, Jr.
*Assistant Examiner*—A. Nobahar
(74) *Attorney, Agent, or Firm*—Marc S. Kaufman; Carlos R. Villamar; Nixon Peabody LLP (57) ABSTRACT

A system and method is disclosed for the secure distribution and consumption of electronic documents using a standard rendering engine. The documents have usage rights associated therewith. A server stores the documents in computer readable form. A user operates a client having a standard application program including a rendering engine capable of rendering unencrypted documents for viewing. The client and the server are coupled by a communications network. A rights management module receives a request from the client for at least one of the documents on the server and delivers the document and a set of rights associated with the document to the client. A connection module attached to the rendering engine receives the set of rights associated with the document. A user interface module attached to the rendering engine controls the user's access to the document in accordance with the list of rights for the user associated with the document.

26 Claims, 4 Drawing Sheets

U.S. PATENT DOCUMENTS

| | | |
|---|---|---|
| 4,658,093 A | 4/1987 | Hellman |
| 4,713,753 A | 12/1987 | Beobert et al. |
| 4,796,220 A | 1/1989 | Wolfe |
| 4,817,140 A | 3/1989 | Chandra et al. |
| 4,827,508 A | 5/1989 | Shear |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,301,231 A | 4/1994 | Abraham et al. |
| 5,311,591 A | 5/1994 | Fischer |
| 5,319,705 A | 6/1994 | Halter et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,394,469 A | 2/1995 | Nagel et al. |
| 5,410,598 A | 4/1995 | Shear |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,748,783 A | 5/1998 | Rhoads |
| 5,757,907 A | 5/1998 | Cooper et al. |
| 5,761,686 A | 6/1998 | Bloomberg |
| 5,765,152 A | 6/1998 | Erickson |
| 5,768,426 A | 6/1998 | Rhoads |
| 5,825,892 A | 10/1998 | Braudaway et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,933,498 A | 8/1999 | Schneck et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,006,332 A * | 12/1999 | Rabne et al. ............... 713/201 |
| 6,047,067 A | 4/2000 | Rosen |
| 6,112,181 A | 8/2000 | Shear et al. |
| 6,115,471 A | 9/2000 | Oki et al. |
| 6,138,107 A | 10/2000 | Elgamal |
| 6,138,119 A | 10/2000 | Hall et al. |
| 6,157,721 A | 12/2000 | Shear et al. |
| 6,182,142 B1 * | 1/2001 | Win et al. .................. 713/201 |
| 6,185,683 B1 | 2/2001 | Ginter et al. |
| 6,226,618 B1 | 5/2001 | Downs et al. |
| 6,233,684 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,298,446 B1 * | 10/2001 | Schreiber et al. .......... 713/201 |
| 6,301,660 B1 | 10/2001 | Benson |
| 6,314,409 B1 | 11/2001 | Schneck et al. |
| 6,327,652 B1 | 12/2001 | England et al. |
| 6,330,670 B1 | 12/2001 | England et al. |
| 6,345,256 B1 | 2/2002 | Milsted et al. |
| 6,363,488 B1 | 3/2002 | Ginter et al. |
| 6,389,402 B1 | 5/2002 | Ginter et al. |
| 2001/0032312 A1 | 10/2001 | Runje et al. |
| 2002/0049910 A1 | 4/2002 | Salomon et al. |
| 2002/0082997 A1 | 6/2002 | Kobata et al. |

FOREIGN PATENT DOCUMENTS

| | | |
|---|---|---|
| EP | 0 911 728 A1 | 4/1999 |
| JP | 62-241061 | 10/1987 |
| JP | 64-068835 | 3/1989 |
| JP | 04-369068 | 12/1992 |
| JP | 05-268415 | 10/1993 |
| JP | 06-175794 | 6/1994 |
| JP | 06-215010 | 8/1994 |
| JP | 07-084852 | 3/1995 |
| JP | 07-200317 | 8/1995 |

| | | |
|---|---|---|
| JP | 07-244639 | 9/1995 |
| JP | 0 715 241 | 6/1996 |
| JP | 10-222567 | 8/1998 |
| JP | 11-031130 | 2/1999 |
| JP | 11-205307 | 7/1999 |
| JP | 2003/522989 | 7/2003 |
| WO | WO 94/01821 | 1/1994 |
| WO | WO 96/24092 | 8/1996 |
| WO | WO 97/48203 | 12/1997 |
| WO | WO 98/11690 | 3/1998 |
| WO | WO 98/42098 | 9/1998 |
| WO | WO 98/45793 | 10/1998 |
| WO | WO 99/35832 | 7/1999 |
| WO | WO 99/45491 | 9/1999 |
| WO | WO 00/08909 A | 2/2000 |
| WO | WO 00/34856 | 6/2000 |
| WO | WO 00/42492 A | 7/2000 |
| WO | WO 00/58811 A | 10/2000 |

OTHER PUBLICATIONS

International Search Report dated Dec. 7, 2001; Form PCT/ISA/220; Form PCT/ISA/210 (total 7 pages).

Henry H. Perritt, Jr., "Technological Strategies for Protecting Intellectual Property in the Networked Multmedia Enviroment", Apr. 2-3, 1993, Knowbots, Permissions Headers & Contract Law.

International Search Report for PCT/US02/00973 dated Feb. 26, 2003 (1 page).

Freeman-Benson, Bjorn N., "Using the Web to Provide Information or Password Protection Without Modifying Clients", School of Computer Science Carleton University.

European Search Report dated Sep. 20, 2004 (European Patent Application No. 03 01 2068).

Cheong S. Ang, et al; "Integrated Control of Distributed Volume Visualization Through the World-Wide-Web"; Visualization '94 Proceedings; 1994 IEEE; University of California, San Francisco; pp. 13-20.

B.J. Van Rijnsoever, et al.; "Interoperable Content Protection for Digital TV"; Multimedia and Expo 2000, ICME 2000; 2000 IEEE; Philips Research; Prof. Holstlaan 4, Eindhoven, The Netherlands; pp. 1407-1410.

European Search Report dated Aug. 9, 2004 (European Patent Application No. 03 01 2069).

Marvin Sirbu, et al.; "NetBill: An Internet Commerce System Optimized for Network-Delivered Services"; IEEE Personal Communications; IEEE Communications Society; US; vol. 2; No. 4; Aug. 1995; pp. 34-39.

Supplementary European Search Report; dated Feb. 8, 2005. (European Application No. 02 70 7466).

* cited by examiner

DOCUMENT DISTRIBUTION MANAGEMENT METHOD AND APPARATUS USING A STANDARD RENDERING ENGINE AND A METHOD AND APPARATUS FOR CONTROLLING A STANDARD RENDERING ENGINE

FIELD OF THE INVENTION

The invention relates to distribution and consumption of documents, and more particularly, to a method and apparatus for controlling various rights in, and access to, the content of documents displayed with the rendering engine of a standard application program, such as an Internet Web Browser.

BACKGROUND OF THE INVENTION

The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software tools (known as "browsers") which allow both HTML (hypertext markup language) viewing and HTTP (hypertext transfer protocol) navigation (known as "browsers"). Browsers allow a simple GUI (graphical user interface) to be used to communicate over the Internet. Browsers generally reside on the computer used to access content on the Internet, i.e. the client computer. HTTP is a component on top of TCP/IP and provides users access to documents of various formats using the standard page description language known as HTML and more recently XML (extensible markup language) and XHTML (extensible hypertext markup language), a reformulation of HTML into XML. The collection of servers on the Internet using HTML/HTTP has become known as the "World Wide Web" or simply the "Web."

Through HTML, XHTML, and interactive programming protocols, the author of content is able to make the content available to others by placing the content, in the form of a Web page, on an Internet Web server. The network path to the server is identified by a URL (Uniform Resource Locator) and, generally, any client running a Web browser can access the Web server by using the URL. A client computer running a browser can request a display of a Web page stored on a Web server by issuing a URL request through the Internet to the Web in a known manner.

Since the Web utilizes standard protocols and a standard rendering engine, i.e. the rendering engine of the browser, the Web has become ubiquitous. One of the primary applications of the Web has been distribution of content in the form of documents. A "document", as the term is used herein, is any unit of information subject to distribution or transfer, including but not limited to correspondence, books, magazines, journals, newspapers, other papers, software, photographs and other images, audio and video clips, and other multimedia presentations. A document may be embodied in printed form on paper, as digital data on a storage medium, or in any other known manner on a variety of media.

However, one of the most important issues impeding the widespread distribution of digital documents, i.e. documents in forms readable by computers, via electronic means, and the Internet in particular, is the current lack of protection of the intellectual property rights of content owners during the distribution and use of those digital documents. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital rights management (DRM)" herein. There are a number of issues in rights management module: authentication, authorization, accounting, payment and financial clearing, rights specification, rights verification, rights enforcement, and document protection for example.

In the world of printed documents, a work created by an author is usually provided, to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital documents. Accordingly, some method of protecting digital documents is necessary to make it more difficult to copy them without authorization.

Unfortunately, it has been widely recognized that it is difficult to prevent, or even deter people from making unauthorized distributions of electronic documents within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of "broadband" communications technologies and the development of what is presently know as the "National Information Infrastructure" (NII) will render it even more convenient to distribute large documents electronically, including video files such as full length motion pictures, and thus will remove any remaining deterrents to unauthorized distribution of documents. Accordingly, DRM technologies are becoming very useful.

Two basic schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's Cryptolopes and InterTrust's Digiboxes fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is still a real challenge to existing technologies, current market trends suggest that open and untrusted systems such as PC's and workstations using browsers to access the Web, will be the dominant systems used to access copyrighted documents. In this sense, existing computing environments such as PC's and workstations equipped with popular operating systems (e.g., Windows™, Linux™, and UNIX) and render applications such as browsers are not trusted systems and cannot be made trusted without significantly altering their architectures. Of course, alteration of the architecture defeats a primary purpose of the Web, i.e. flexibility and compatibility.

U.S. Pat. No. 5,715,403, the disclosure of which is incorporated herein by reference, discloses a system for controlling the distribution of digital documents. Each rendering device has a repository associated therewith. A predetermined set of usage transaction steps define a protocol used by the repositories for carrying out usage rights associated with a document. However, the use of repositories renders application of the system to distributed networks, such as the Internet, difficult without assuming that the repositories are physically secure and behave in a trusted manner (which may require use of proprietary rendering engine to enforce usage rights associated with documents).

Accordingly, two basic approaches have been taken to control the distribution of documents over the Web. The first approach is the use of subscription based services in which the user is only granted access to content after paying a subscription fee. However, once the subscription fee is paid and the document is rendered by the browser, the user can copy, print, and modify the document, i.e. all control of the document by the publisher is lost.

The second approach is to utilize proprietary formats wherein the document can only be rendered by a select rendering engine that is obligated to enforce the publisher's rights. Of course, this approach requires the use of a single proprietary format and loses the ability to combine plural popular formats and the richness of content associated therewith. Further, this approach requires the user to use a previously unknown rendering application and requires development of the rendering application for each format to be rendered in a secure manner. Further, the documents must be generated or converted using non-standard tools.

Further, there are various known mechanisms by which functionality can be added to a standard rendering engine, such as a Web browser. For example, an ActiveX control can be automatically downloaded and executed by a Web browser. ActiveX is a set of rules for how applications should share information and ActiveX controls can be developed in a variety of programming languages, including C, C++, Visual Basic, and Java.

An ActiveX control is similar to a Java applet. Unlike Java applets, however, ActiveX controls have full access to the Windows™ operating system. Microsoft™ has developed a registration system so that browsers can identify and authenticate an ActiveX control before downloading it run on all platforms, whereas ActiveX controls are currently limited to Windows environments.

A scripting language called VBScript enables Web authors to embed interactive elements in HTML documents to initiate a download and installation of ActiveX controls and other functions. Currently, Microsoft's Web browser, Internet Explorer™, supports Java, JavaScript, and ActiveX, whereas Netscape's Navigator™ browser supports only Java and JavaScript, though its plug-ins can enable support of VBScript and ActiveX.

VYOU.COM has developed a system for protecting intellectual property in documents distributed over the Web. The system includes a software plug-in, to the user's Web browser. The plug-in includes a rendering engine for the proprietary format in which documents are represented and transmitted. Accordingly, documents must be reformatted into the proprietary format and the plug-in rendering engine for the appropriate final viewing format is used in place of the standard browser rendering engine. This arrangement requires the rendering engine for each format must be developed. Therefore, this system is difficult to implement and loses the advantages of the Web as an open architecture.

The proliferation of the Web, and its usefulness in document distribution, makes it desirable to apply DRM features to Web browsers and other standard rendering engines without requiring the rendering engines to be rewritten. However, conventional DRM technologies are not easily adapted to use with Web browsers and other standard rendering engines because they require proprietary formats and rendering engines which contradict the open architecture of the Web. The inability to control application programs, such as Web browsers, independently from their rendering engines has made it difficult to apply DRM features over distribution networks.

SUMMARY OF THE INVENTION

It is an object of the invention to facilitate distribution of digital documents.

It is another object of the invention to control the usage rights associated with a digital document.

It is another object of the invention to add DRM features to documents rendered with standard rendering engines.

It is another object of the invention to apply DRM technologies to an open system over a distributed network without the need for proprietary formats or a plurality of proprietary rendering engines.

It is another object of the invention to minimize the need for modifying standard rendering engines when applying DRM technologies.

It is another object of the invention to facilitate compensation to authors, distributors, and other parties for publishing and distribution of digital documents.

It is another object of the invention to control standard application programs independently of their associated rendering engines.

It is another object of the invention to allow the owners of content to create and distribute their content using industry standard tools and formats without having to convert the content to a proprietary format.

To achieve these objects, a first aspect of the invention is a system for distributing digital documents having one or more usage rights associated therewith. The system comprises a server having at least one document stored thereon in computer readable form, a client having a standard application program including a rendering engine capable of rendering unencrypted documents for viewing, a communications network coupled to the client and the server, a rights management module module for receiving a request for at least one of the documents from the client and delivering the at least one document and a set of rights associated with the at least one document to the client, a connection module adapted to be attached to the rendering engine for receiving the list of rights associated with the at least one document, a user interface module adapted to be attached to the rendering engine for controlling the access by the client to the at least one document in accordance with the set of rights associated with the at least one document.

BRIEF DESCRIPTION OF THE DRAWING

The invention is described through a preferred embodiment and the attached drawing in which.

DETAILED DESCRIPTION OF THE PREFERRED EMBODIMENT

The invention is described below with reference to a preferred embodiment. It will be apparent that the invention can be embodied in a wide variety of forms, some of which may be quite different from those of the disclosed embodiment. Consequently, the specific structural and functional details disclosed herein are merely representative and do not limit the scope of the invention.

Figure 1:
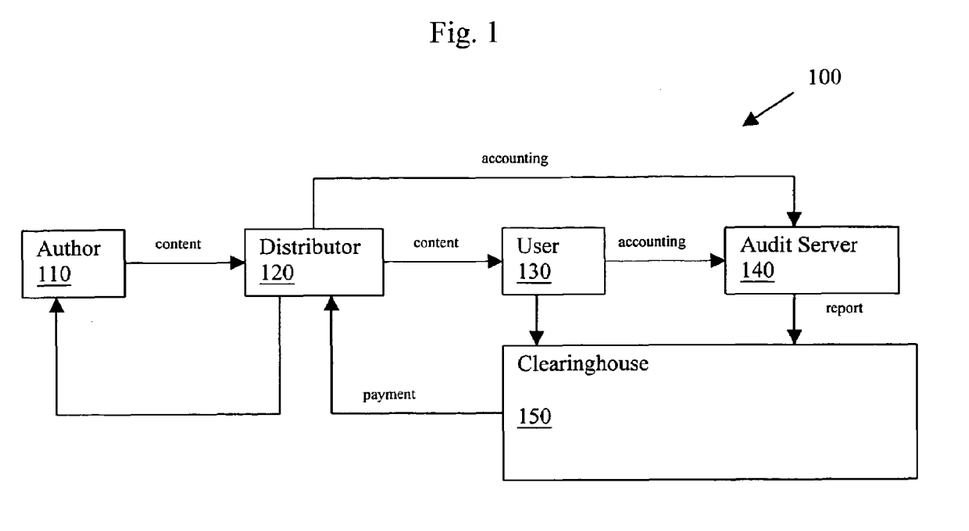
FIG. 1 is a block diagram of a conventional document distribution system utilizing DRM technology.

FIG. 1 is a block diagram of a conventional model for a system for the electronic distribution of documents, which as defined above, may include correspondence, books, magazines, journals, newspapers, other papers, software, audio and video clips, and other files objects, and the like.

Author 110 creates original content 112 and passes it to a distributor 120 for distribution. Ordinarily, author 110 is the creator of the content. However, the term "author" as used herein can be the creator, owner, editor, or other entity controlling the content or an agent (e.g. a publisher) of one of those entities. Also author 110 may distribute documents directly, without involving another party as distributor 120 and thus the author and distributor may be the same entity. However, the division of functions set forth in FIG. 1 is more efficient, as it allows author 110 to concentrate on content creation and not the administrative functions of distribution. Moreover, such a breakdown facilitates economies of scale by permitting distributor 120 to associate with a number of authors 110. The term "document", as used herein, generally refers to any type of content, such as text, audio, or other data, including any encryption, formatting, or the like. The term "content", as used herein, generally refers to the underlying information of a document. However, these terms overlap and thus are used interchangeably herein. Distributor 120 distributes documents to user 130 upon request. In a typical electronic distribution model, the content is distributed as a document in encrypted form. Distributor 120 encrypts the content with a random key and then encrypts the random key with a public key corresponding to user 130. Thus the encrypted document is customized solely for the particular user 130. User 130 is then able to use their private key to unencrypt the random key and use it to unencrypt and view the document.

Payment for the document is passed from user 130 to distributor 120 by way of clearinghouse 150 which collects requests from user 130 and from other users who wish to view a particular document. Clearinghouse 150 also collects payment information, such as debit transactions, credit card transactions, or other known electronic payment schemes, and forwards the collected payments as a payment batch to distributor 120. Of course, clearinghouse 150 may retain a share of the payment as a fee for the above-noted services. Distributor 120 may retain a portion of the batch payment from clearinghouse 150 for distribution services and forward a payment (for example royalties) to author 110. Distributor 120 may await a bundle of user requests for a single document before distributing the document. In such a case, a single encrypted document can be generated for unencryption by all of the requesting users 130.

Each time user 130 requests (or uses) a document, an accounting message is sent to audit server 140 which ensures that each request by user 130 matches with a document sent by distributor 120. Accounting information is received by audit server 140 directly from distributor 120. Any inconsistencies are transmitted via a report to clearinghouse 150, which can then adjust the payment batches made to distributor 120 accordingly. This accounting scheme is present to reduce the possibility of fraud in electronic document distribution and to handle any time-dependent usage permissions that may result in charges that vary, depending on the duration or other extent of use. The model for electronic document distribution illustrated in FIG. 1, is well known generally and can be applied to the electronic document distribution system disclosed herein.

Figure 2:
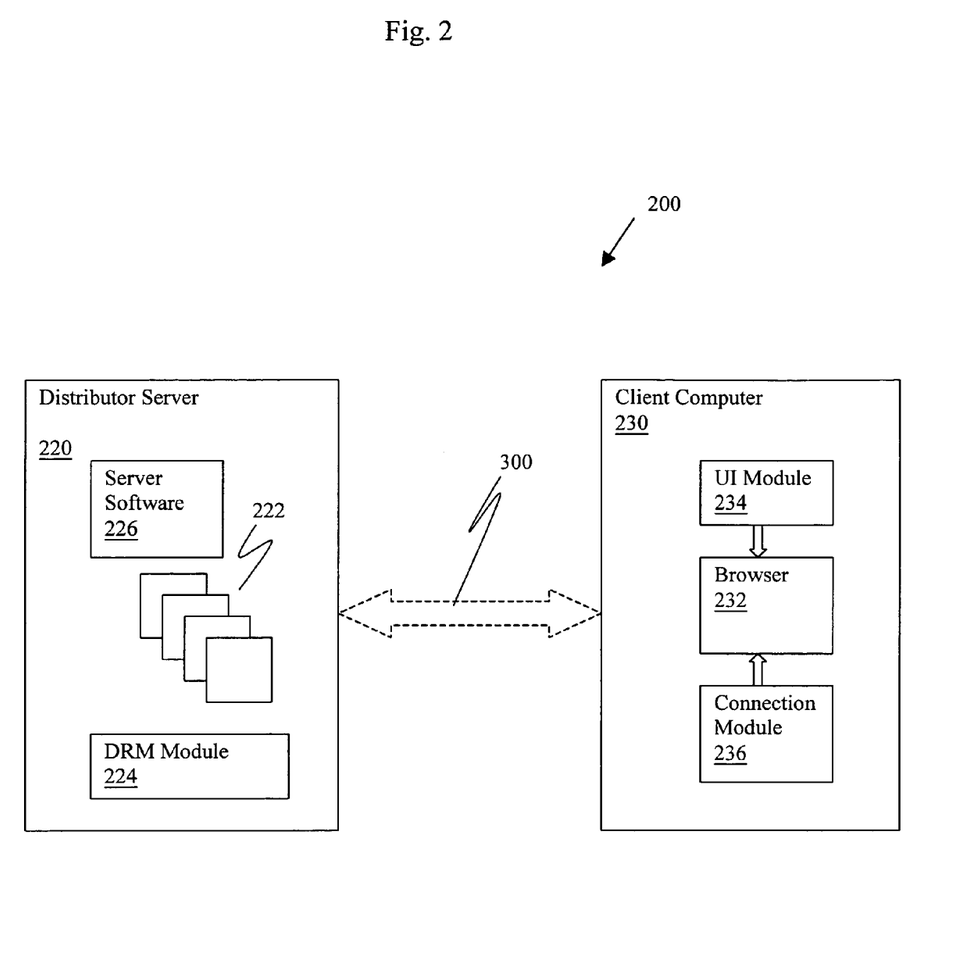
FIG. 2 is a schematic representation of a DRM system of the preferred embodiment.

FIG. 2 is a schematic representation of a document distribution system in accordance with a preferred embodiment of the invention. As noted above, the invention can be used in connection with known models for effecting accounting and payment of fees, such as use of a clearinghouse and an audit server. Further, the invention can be used in connection with various commerce models. Accordingly, the apparatus for auditing distribution, effecting payment, and authoring a document is not described in detail herein and is omitted from the discussion of the preferred embodiment to simplify description thereof.

As illustrated in FIG. 2, digital document distribution system 200 comprises distributor server 220, corresponding to distributor 120 described above, and client computer 230, corresponding to user 130 described above. Server 220 and client 230 can be general purpose computers programmed to accomplish the desired functions. For example, server 220 can be a standard server or workstation running the Windows NT™ operating system and including HTTP server software 226 such as Apache™ or another HTTP server. Client 230 can be a personal computer running the Windows™ operating system. In the preferred embodiment, server 220 and client 230 are each coupled to communications network 300, such as the Internet, or more specifically, the Web. Accordingly, client 230 includes browser 232 as a standard application program having a rendering engine. Browser 232 can be any HTTP compliant browser, such as Microsoft Internet Explorer™ or Netscape Navigator™. The phrase "standard application program", as used herein, refers to any application program designed to accomplish a task, such as document creation, viewing and editing, and having a rendering engine. Examples of standard application programs include word processors, Web browsers, editors, viewers, spreadsheet programs, database programs, and the like.

Server 220 has a plurality of documents 222 stored thereon, in the form of Web pages, for distribution. Documents 222 can be stored in an encrypted format. The term "encrypted", as used herein, refers to any mechanism by which accessibility of content is partially or completely prohibited, such as by use of asymmetric or symmetric encryption algorithms, scrambling algorithms, or the like.

Server 220 also includes rights management module 224, in the form of software, for storing and managing rights associated with particular documents 222, users, and/or payment amounts as will be described in greater detail below.

Client 230 also has user interface (UI) module 234 and connection module 236 each in the form of software and each adapted to attach to browser 232 without the need for modification of browser 232. For example, UI module 234 and connection module 236 can be in the form of plug-ins, ActiveX controls, or in any form that allows attachment to the rendering engine of browser 232 without the need for modifying the code of browser 232. Such attachment is described in greater detail below.

Rights management module 224 is a server side component that identifies which rights are associated with each document 222. The rights also can vary based on the identity of the user requesting access to document 222, and/or any payment made by the user through a clearinghouse or the like. For example, the user may have the option of paying one fee to view document 222 or a higher fee for viewing and printing the same document 222, as is well known. Rights management module 224 is also operative to deliver the appropriate list of rights along with the document, via communications network 300, to connection module 236 of client 230 as described below.

Connection module 236 is a client side software component which verifies the integrity of the environment of client 230 by verifying that UI module 234 is attached to browser 232, identifies the user of client 230, i.e. the person requesting content, retrieves the document and the appropriate list of rights sent by rights management module 224, and in appropriate circumstances, unencrypts any retrieved documents that are encrypted. UI module 234 is a client side component that that monitors requests from the user to access content of documents 222 and either grants or denies the request based on the list of rights retrieved by connection module 236. Further, UI module 234 can disable specified functions of browser 232 and the operating system of client 230 based on the list of rights in the manner described below, by interfacing with the operating system API and intercepting and redirecting commands for example. Connection module 236 verifies that the industry standard rendering engine running in the environment of client 230 has not been tampered with or otherwise compromised in a way that may allow the user to access protected content in a way that bypasses UI module 234.

Figure 3:
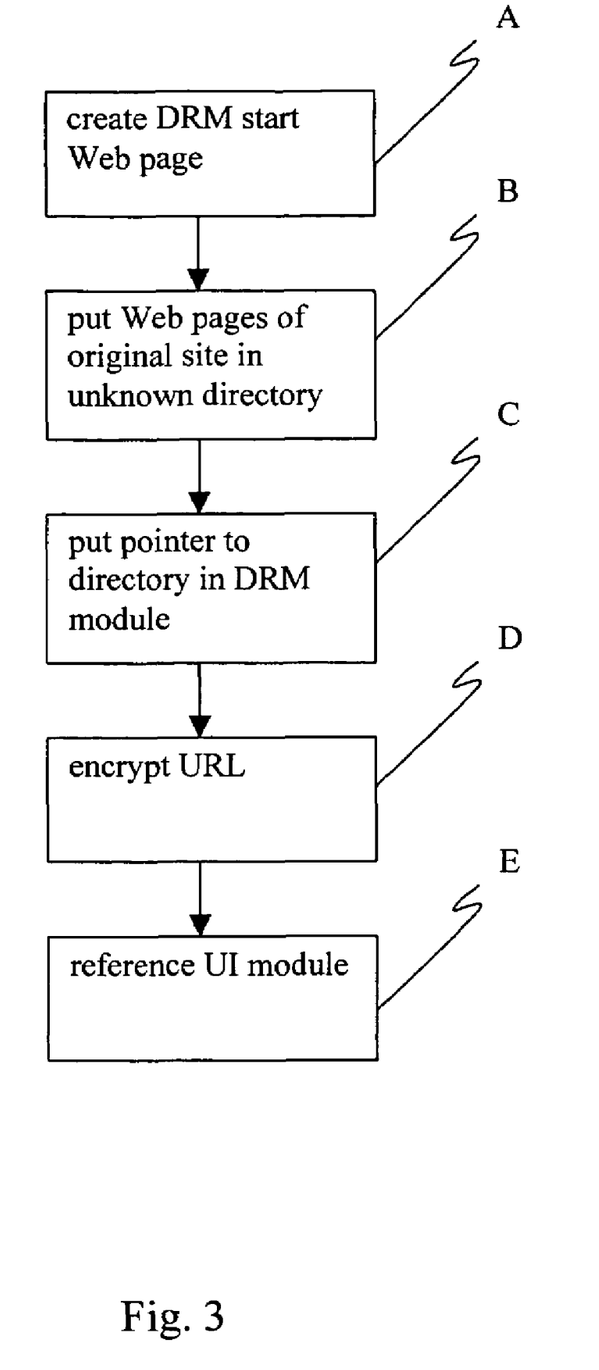
FIG. 3 is a flowchart of the procedure for causing the server to respond only to a protected client in accordance with the preferred embodiment.

The invention can be implemented in connection with known client/server networking architectures, such as the Web, without modifying obviating, or bypassing the standard client software, server software, and rendering engines. Rights management module 224 is installed in server 220 along side the existing server software 226. As noted above, rights management module 224 identifies which rights are associated with documents 222 existing on server 220 or later stored on server 222. For example rights management module 224 can have a programmable database, lookup table, or the like including the various rights associated with each document 222 and other variables, such as the identity of the user and the payment made by the user, in a well known manner. Rights management module 224 further interfaces with the operating system API of server 220 to cause server software 226 to only respond to connections from client(s) 230 having connection module 236 and UI module 234. In particular, once rights management module 224 is installed, the procedure illustrated in FIG. 3 is accomplished. In step A, a new DRM start Web page, or other secure interface display, is created which references UI module 234 and the existing server start Web page. In step B, the various Web pages of a Web site on server 220 can be placed in a directory having a random label or any unknown directory. In step C, rights management module 224 is programmed to include a pointer to this directory, and, in step D, rights management module 224 encrypts the URL of this directory. In step E, the start DRM Web page is modified to reference UI module 235 which can instruct connection module 236 to unencrypt the encrypted URL to permit access to original start page and to the rest of the Web site. If client 230 does not have UI module 234 and connection module 236, the URL cannot be unencrypted and thus the Web site on server 220 cannot be accessed.

Alternatively, connection module 236 can generate a signature and send the signature to server 220 with any URL request to server 220. Access to the Web site on server 220 will only be granted if the signature is present and valid. In this alternative, rights management module 224 can include code to validate the signature.

When a user of client computer 230 attempts to access server 220 having rights management module 224, rights management module 224 verifies if UI module 234 is installed on client 230 as described above. If not, instructions in the DRM start Web page, in the form of a java applet, ActiveX control, or the like, instruct browser 232 to download and install UI module 234. Download can be accomplished from server 220 or another server coupled to communications network 300. Such download and installation can be accomplished in a known manner using conventional mechanisms, and the user can be prompted to authorize installation and to enter other necessary information, such as where to store the installation files. Connection module 236 can be imbedded in UI module 234 and downloaded and installed simultaneously or through a separate download and installation process. Of course, if UI module 234 is detected as installed on server 230, the installation step can be skipped. If UI module 234 is not installed on client 230, and the user does not authorize such installation, access to documents on server 222 is prohibited, or limited only to documents specified as being freely distributable.

As noted above, UI module 234 and connection module 236 are in a form in which they can be attached to browser 232 without the need to modify the code of browser 232. The term "attached" as used herein with respect to the modules, refers to software modules that can be combined or coupled with browser without modifying the code of browser 232. For example, UI module 234 and connection module 236 are in the form of plug-ins, in the case of Netscape Navigator™ or ActiveX Controls in the case of Internet Explorer™. The mechanisms for developing and installing such components are well known.

Figure 4:
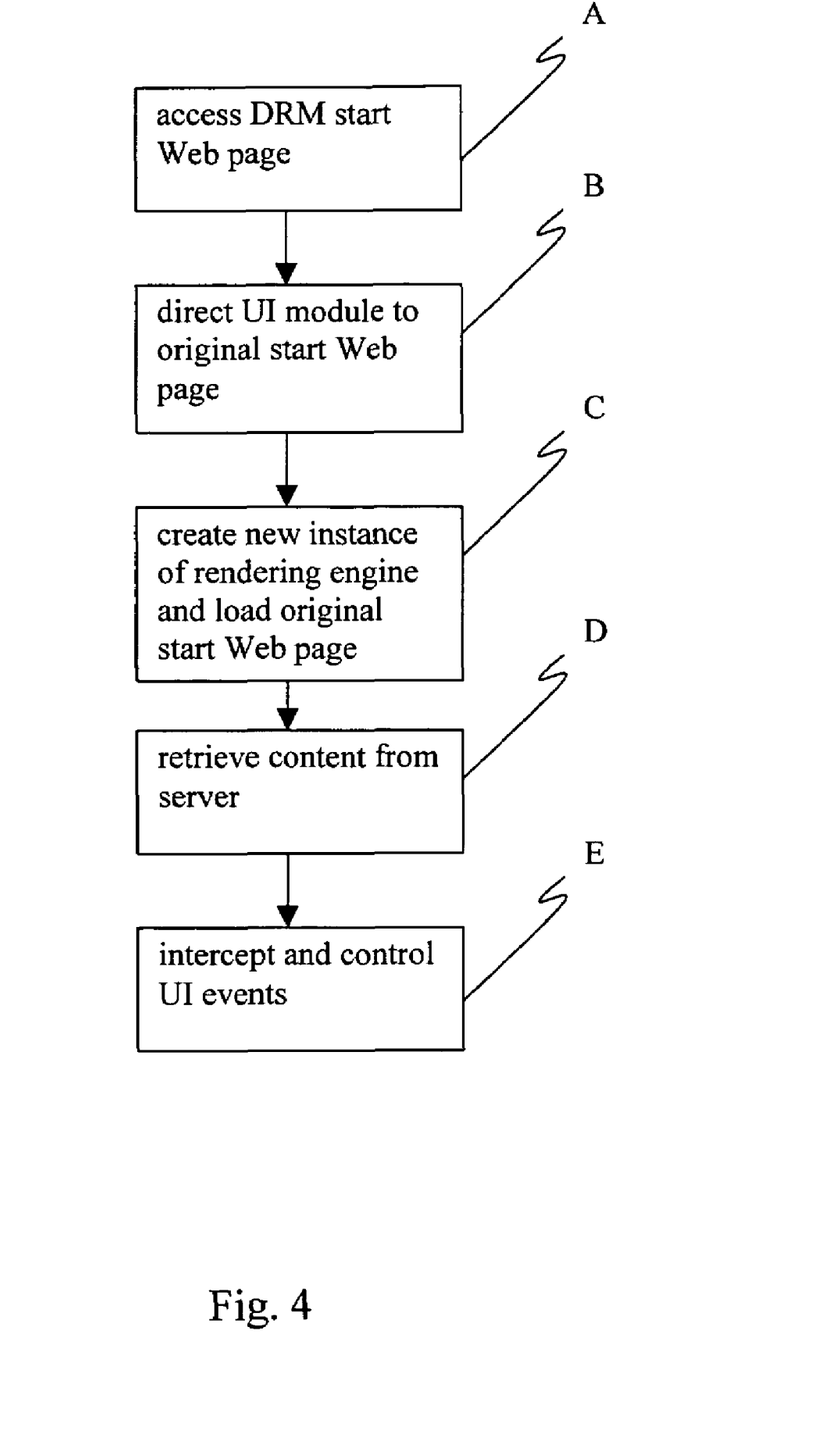
FIG. 4 is a flowchart of the procedure for accessing protected content in accordance with the preferred embodiment.

The procedure for accessing protected content stored on server 220 is illustrated in FIG. 4. In step A, the DRM start Web page is accessed through its URL in a known manner. In step B, the DRM start Web page directs UI module 234 to the original start page or pages referenced by the DRM start Web page using one of the methods described above. In step C, UI module 234 creates another instance of the rendering engine of browser 232, loads the original start Web page, and instructs the operating system to display the new instance in a browser window, using known techniques. The new instance is directed, by UI module 234, to retrieve content from server 220 through connection module 236 in step D. In other words, in the preferred embodiment, UI module 234 intercepts commands from browser 232 and redirects them through connection module 236. UI module 234 can instruct the new instance to utilize a secure asynchronous protocol through connection module 236. Therefore, UI protection is validated and all user interface events, can be intercepted and controlled in step E. For example, when the user initiates a "print" or "copy" command through the standard user interface of browser 232, UI module 234 intercepts the request and only permits response if the set of rights received by connection module 236 permits the requested function to be carried out.

More specifically, when connection module 236 receives a request from the rendering engine of browser 232, connection module 236 validates that the rendering engine is protected by UI module 234, i.e. UI module 234 is attached, and that the rendering engine has not been tampered with or otherwise compromised. If so, connection module 236 permits connection to rights management module 224 of server 220 and negotiates permission to retrieve the original start Web page on server 220 and the set of rights for the user for the Web page. Rights management module 224 then initiates a connection between server software 226 of server 220 and connection module 236 of client 230. The connection can be established using any protocol, such as HTTP or HTTPS or any other standard or proprietary connection protocol. The requested document 222 is then retrieved and delivered to connection module 236 which unencrypts document 222, if encrypted on server 220, and delivers the document in unencrypted form to the new instance of the rendering engine of browser 232 along with the set of rights associated with the document. Once again, the contents of the set of rights may be determined based on the document, the user's identity, a payment made by the user, or any other appropriate parameter. Connection module 236 then transmits the set of rights to UI module 234 which limits the functions available to the user based on the set of rights by controlling the new instance of the rendering engine of browser 236 as described above.

The content of the document is now viewable in a window of browser 232 as any other Web page would be. However, browser 232 does not have direct access to the Web page of the document because browser 232 is "wrapped" by UI module 234. UI modules 234 prevents browser 232 from performing any prohibited functions outside of the scope of the set of rights for the document.

The invention utilizes a standard rendering engine of an application program, such as a browser, a word processor, or any other application or display program. The invention achieves this by interfacing with the application and standing between the application and the document to control access to the document. Accordingly, the invention does not require a separate proprietary rendering engine for each document format because the application rendering engine is used. Further, any data format supported by the application will be supposed by the invention without modification.

The invention can be implemented over any type of communications Network, such as the Internet, a local area network (LAN), a wide area network (WAN), direct computer connections, or the like, using any type of communication hardware and protocols. Any type of hardware or combination of hardware can be used for the various clients and servers. Accordingly, the terms "client" and "server" as used herein, can refer to any type of computing device or data terminal, such as a personal computer, a portable computer, a dumb terminal, a thin client, a hand held device, a wireless phone, or any combination of such devices. The various clients and servers can be a single computer at a single location or multiple computers at a single or multiple locations. For example a server may be comprised of a plurality of redundant computers disposed in co-location facilities at various locations to facilitate scalability. There can be any number of clients and any number of servers. The client can physically be located on the same hardware as the server.

Any appropriate server or client software can be used and any communication protocols can be used. Communication can be accomplished over electric cable, fiber optic cable, or any other cable, or in a wireless manner using radio frequency, infrared, or other technologies. The various information can be stored in any format and thus the term "database" as used herein refers to any collection of information such as a database file, a lookup table, or the like. The documents can be of any type and can contain any type of content, such as text, audio information, video information, or combinations of plural types of content. The portions of the invention described above that are described as software components could be implemented as hardware. Moreover, while certain functional blocks are described herein as separate and independent from each other, these functional blocks can be consolidated and performed on a single general-purpose computer, or further broken down into sub-functions as recognized in the art. The set of rights can be one or more rights or rules governing use of the document, can be in any appropriate form, and can be based on various parameters such as the document type, the user's identity, a payment by the user, and the like. The various software modules can be located on the client or the server.

While a preferred embodiment of the invention has been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations. Accordingly, the true scope of the invention is defined by the appended claims and legal equivalents.

What is claimed is:

1. A system for distributing and enforcing use of digital documents having usage rights associated therewith, said system comprising:

a server having at least one document stored thereon in computer readable form;

a client having a standard application program including a rendering engine capable of rendering unencrypted documents for viewing;

a communications network coupled to said client and said server;

a rights management module included in said server and configured for receiving a request for at least one of the documents from said client and delivering the at least one document and a set of rights associated with and for enforcing use of the at least one document to said client;

a connection module which is downloaded and included in said client and is attached to but separate from said rendering engine for receiving the set of rights associated with the at least one document, for verifying the integrity of the client by confirming a user interface module is attached to said rendering engine, and for verifying the integrity of the rendering engine;

a user interface module which is downloaded and included in said client and is attached to but separate from said rendering engine for controlling access by the client to the at least one document for enforcing use of the at least one document in accordance with the set of rights associated with said at least one document.

2. A system as recited in claim 1, wherein said connection module is operative to detect whether said user interface module is attached to said rendering engine and for providing the at least one of the documents to said rendering engine if said user interface module is attached to said rendering drive.

3. A system as recited in claim 2, wherein said connection module is operative to unencrypt the at least one of the documents.

4. A system as recited in claim 2, wherein said standard application program is a Web browser and said server includes an HTTP server.

5. A system as recited in claim 4, wherein said connection module and said user interface module attach to the rendering engine of the Web browser using at least one of ActiveX controls and plug-in technology.

6. A system as recited in claim 4, wherein said rights management module comprises means for pointing to a start Web page stored on said server, and means for encrypting said means for pointing and wherein said connection module comprises means for unencrypting said means for pointing and wherein said system further comprises means for generating a secure start Web page which references said connection module and said means for pointing.

7. A system as recited in claim 4, wherein said connection module comprises means for generating a signature and said rights management module comprises means for validating the signature, and wherein a request to said server is honored only if the signature is present and valid.

8. A system as recited in claim 1, wherein the connection module verifies the integrity of the rendering engine by verifying that the rendering engine has not been tampered with or otherwise compromised in a way that allows access to the at least one document in a way that bypasses the user interface module.

9. A system as recited in claim 1, wherein the rendering engine does not have direct access to the at least one document because the rendering engine is wrapped by the user interface module to prevent the rendering engine from performing prohibited functions outside of a scope of the set of rights associated with and for enforcing the use of the at least one document.

10. A method for distributing and enforcing use of digital documents having one or more usage rights associated therewith, said method comprising the steps of:
    storing at least one document on a server in computer readable form;
    accessing the server with a client having a standard application program including a rendering engine capable of rendering unencrypted documents;
    receiving by a rights management module included in said server a request for at least one of the documents from the client;
    delivering by said rights management module the at least one of the documents and a set of rights associated with and for enforcing use of the at least one of the documents to the client;
    downloading a connection module and a user interface module to said client;
    receiving the list of rights associated with the at least one of the documents with said connection module included in said client and attached to but separate from the rendering engine and that verifies the integrity of the client by confirming a user interface module is attached to said rendering engine and verifies the integrity of the rendering engine;
    controlling access by the client to the at least one of the documents for enforcing use of the at least one document in accordance with the set of rights associated with the at least one of the documents through said user interface module included in said client and attached to but separate from the rendering engine.

11. A method as recited in claim 10, further comprising the step of unencrypting the at least one of the documents.

12. A method as recited in claim 10, further comprising the steps of detecting whether the user interface module is attached to the rendering engine and providing the at least one document to the rendering engine if the user interface module is attached to the rendering drive.

13. A method as recited in claim 12, wherein said step of detecting further comprises determining whether said rendering engine has been compromised.

14. A method as recited in claim 12, wherein said standard application program is a Web browser and said server includes HTTP server software.

15. A method as recited in claim 14, further comprising the steps of providing a pointer on the server to a start Web page stored on the server, encrypting the pointer, generating a secure start Web page on the server which references the pointer, providing access to the secure start Web page through the Web browser, and unencrypting the pointer on the client to provide the Web browser access to the start Web page on the server.

16. A method as recited in claim 14, further comprising the steps of generating a signature with the client, transmitting the signature to the server with a request to the server, validating the signature with the server, and honoring the request only if the signature is present and valid.

17. A method as recited in claim 10, wherein the step of verifying the integrity of the rendering engine includes verifying that the rendering engine has not been tampered with or otherwise compromised in a way that allows access to the at least one document in a way that bypasses the user interface module.

18. A method as recited in claim 10, further comprising wrapping the rendering engine with the user interface module so that the rendering engine does not have direct access to the at least one document to prevent the rendering engine from performing prohibited functions outside of a scope of the set of rights associated with and for enforcing the use of the at least one document.

19. In a computer architecture including a server having documents stored thereon, a start page for accessing the documents, and a client running an application program having a rendering engine, a method of distributing and enforcing use of documents comprising the steps of:
    installing a rights management module on the server;
    downloading a connection module and a user interface module to said client;
    attaching said user interface module and said connection module to the rendering engines,
    wherein said user interface module and said connection module are separate from said rendering engine;
    creating a secure start page on the server;
    placing the documents in directory;
    programming the rights management module to include a pointer to the directory;
    encrypting an address to the directory;
    modifying the secure interface display to reference the user interface module and the start page;

verifying the integrity of the client with the connection module by confirming the user interface module is attached to the rendering engine;

verifying the integrity of the rendering engine with the connection module;

unencrypting the address to the directory with the connection module to permit access to the start page and the documents on the server; and enforcing use of the documents with the user interface module in accordance with a set of rights associated with the documents.

20. A method as recited in claim 19, wherein the server includes HTTP server software, wherein the application program is a Web browser, wherein the secure interface display is a secure start Web page and wherein the address to the directory is in the form of a URL.

21. A method as recited in claim 20, further comprising the steps of:

accessing the secure start Web page by issuing a URL to the start page;

directing the user interface module to the start page through the reference to the start page in the secure start Web page;

creating an instance of the rendering engine;

loading the start page in the instance of the rendering engine to display the start page on the client; and directing the instance of the rendering engine, under control of the user interface module, to retrieve one or more of the documents from the server.

22. A method as recited in claim 20, wherein said step of directing the instance comprises the steps of intercepting commands from the Web browser with the user interface module and redirecting the commands through the connection module on the server.

23. A method as recited in claim 20, wherein said step of redirecting comprises the steps of instructing the instance to utilize a secure asynchronous protocol through the connection module.

24. A method as recited in claim 20, further comprising the steps of validating, with the connection module, that the user interface module is attached to the rendering engine and permitting the client to connect to the server only if the validation step is positive.

25. A method as recited in claim 19, wherein the step of verifying the integrity of the rendering engine includes verifying that the rendering engine has not been tampered with or otherwise compromised in a way that allows access to the documents in a way that bypasses the user interface module.

26. A method as recited in claim 19, further comprising wrapping the rendering engine with the user interface module so that the rendering engine does not have direct access to the documents to prevent the rendering engine from performing prohibited functions outside of a scope of the set of rights associated with and for enforcing the documents.

* * * * *